Figure 1:
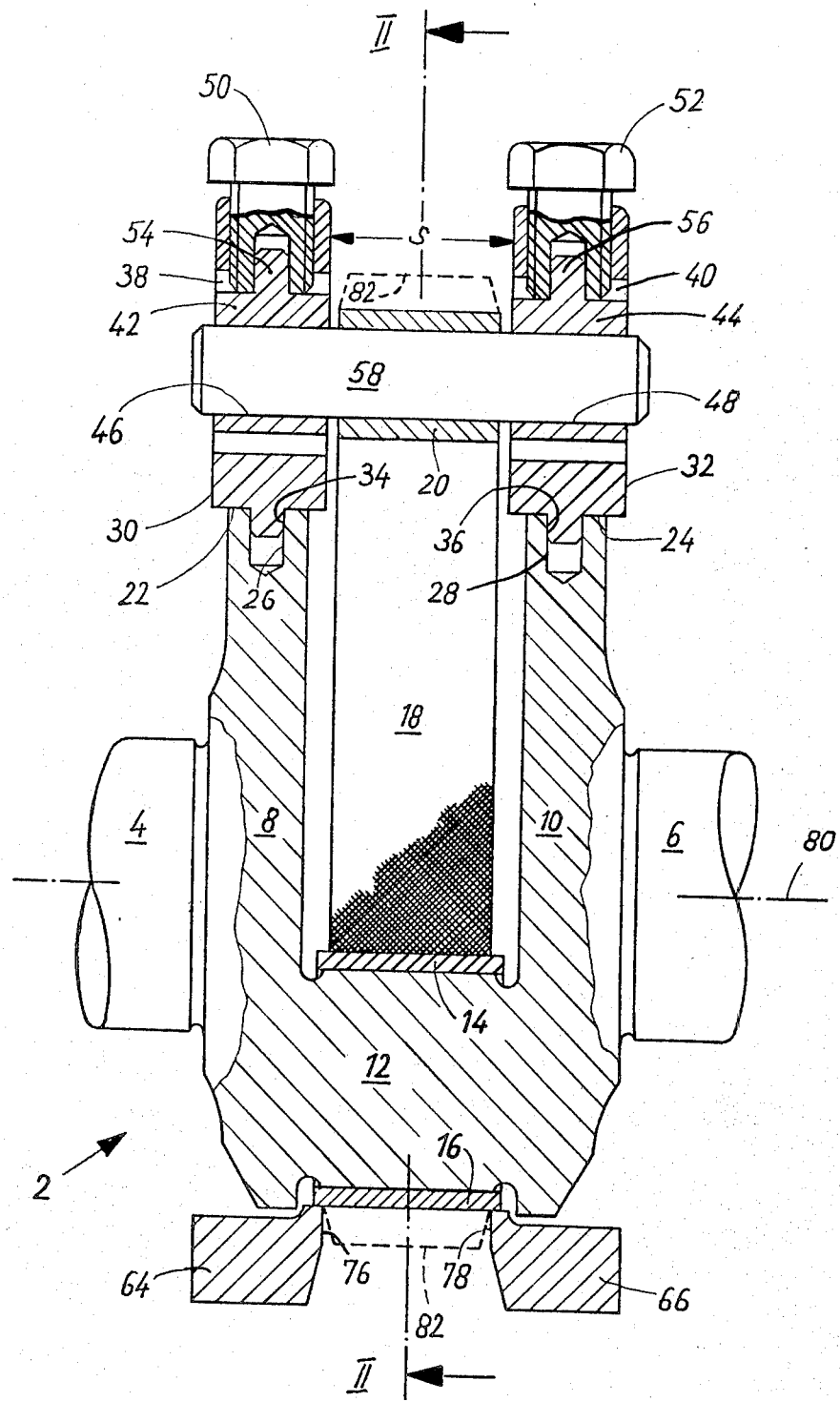

United States Patent [19]

Schaper et al.

[11] 4,408,380
[45] Oct. 11, 1983

[54] METHOD FOR MAKING CONNECTING RODS FOR INTERNAL COMBUSTION ENGINES

[75] Inventors: Siegfried Schaper; Anton Wimmer, both of Gaimersheim; Werner Dommes, Ingolstadt, all of Fed. Rep. of Germany

[73] Assignee: Audi NSU Auto Union Aktiengesellschaft, Neckarsulm, Fed. Rep. of Germany

[21] Appl. No.: 145,770

[22] Filed: Apr. 30, 1980

[30] Foreign Application Priority Data

May 4, 1979 [DE] Fed. Rep. of Germany ....... 2918028

[51] Int. Cl.³ .................. B23P 15/00; F02B 75/32; G05G 1/00
[52] U.S. Cl. .................. 29/156.5 A; 123/197 AC; 74/579 E; 74/579 R; 156/172; 29/559
[58] Field of Search ............... 29/156.5 A, 6, 559; 123/197 AB, 197 AC; 74/579 R, 579 E; 156/172, 169, 166

[56] References Cited

U.S. PATENT DOCUMENTS 2,588,241  3/1952  Huffman ..................... 74/579 R
3,362,252  1/1968  Ditlinger .................... 74/579 R
3,460,628  8/1969  Tankersley .................. 156/169
4,038,885  8/1977  Jonda ........................ 74/579 R
4,183,261  1/1980  Eiselbrecher et al. ......... 74/579 R
4,184,384  1/1980  Levine ....................... 74/579 R

FOREIGN PATENT DOCUMENTS 167563  8/1921  United Kingdom ............ 74/579 R

Primary Examiner—Daniel C. Crane
Attorney, Agent, or Firm—Lalos, Leeds, Keegan, Lett & Marsh

[57] ABSTRACT

A method of making a connecting rod for an internal combustion engine having a one-piece crankshaft construction generally consisting of positioning a first crankpin bushing segment having a connecting rod shank consisting of a reinforced resinous material mounted thereon, on a crankpin of the crankshaft, positioning a second crankpin bushing segment on the crankpin, and applying a reinforcing material and a resinous material about a periphery of the connecting rod shank and the second crankpin bushing segment to form an integral unit consisting of the crankpin bushing segments embedded in the connecting rod shank, attached to the crankpin.

6 Claims, 2 Drawing Figures

METHOD FOR MAKING CONNECTING RODS FOR INTERNAL COMBUSTION ENGINES

This invention relates to a method and apparatus for making connecting rods for internal combustion engines and more particularly to a method of forming and mounting a connecting rod consisting of a reinforced resinous material on a single-piece crankshaft of an internal combustion engine, and a fixture for practicing such method.

In the prior art, there has been proposed the use of connecting rods in internal combustion engines formed of an epoxy resin reinforced with carbon fibers, having the crankpin and piston pin bushings embedded in the reinforced resin material. The use of such connecting rod, however, requires a multi-sectional crankshaft construction in lieu of a conventional single-piece crankshaft construction, which must be fabricated with a great deal of precision and assembled with extreme care, resulting in a crankshaft and connecting rod assembly which is comparatively complex in design and costly to manufacture, particularly in four-cylinder internal combustion engines. It thus has been found to be desirable to provide an improved method of making a connecting rod for an internal combustion engine, consisting of a reinforced resinous material, and attaching such a connecting rod to a single-piece crankshaft of an engine.

Accordingly, it is the principal object of the present invention to provide an improved method of making a connecting rod for an internal combustion engine.

Another object of the present invention is to provide an improved method of making a connecting rod for an internal combustion engine, consisting of a reinforced resinous material.

A further object of the present invention is to provide an improved method of making a connecting rod consisting of a reinforced resinous material for an internal combustion engine having a single-piece crankshaft.

A still further object of the present invention is to provide an improved method of making a connecting rod consisting of a reinforced resinous material and mounting such a connecting rod on a single-piece crankshaft of an internal combustion engine.

Another object of the present invention is to provide an improved method of making a connecting rod from a reinforced resinous material and mounting such a connecting rod on a single-piece crankshaft of an internal combustion engine which is comparatively simple and inexpensive.

A further object of the present invention is to provide a novel fixture for making a connecting rod consisting of a reinforced resinous material and mounting such a connecting rod on a single-piece crankshaft of an internal combustion engine.

Figure 2:
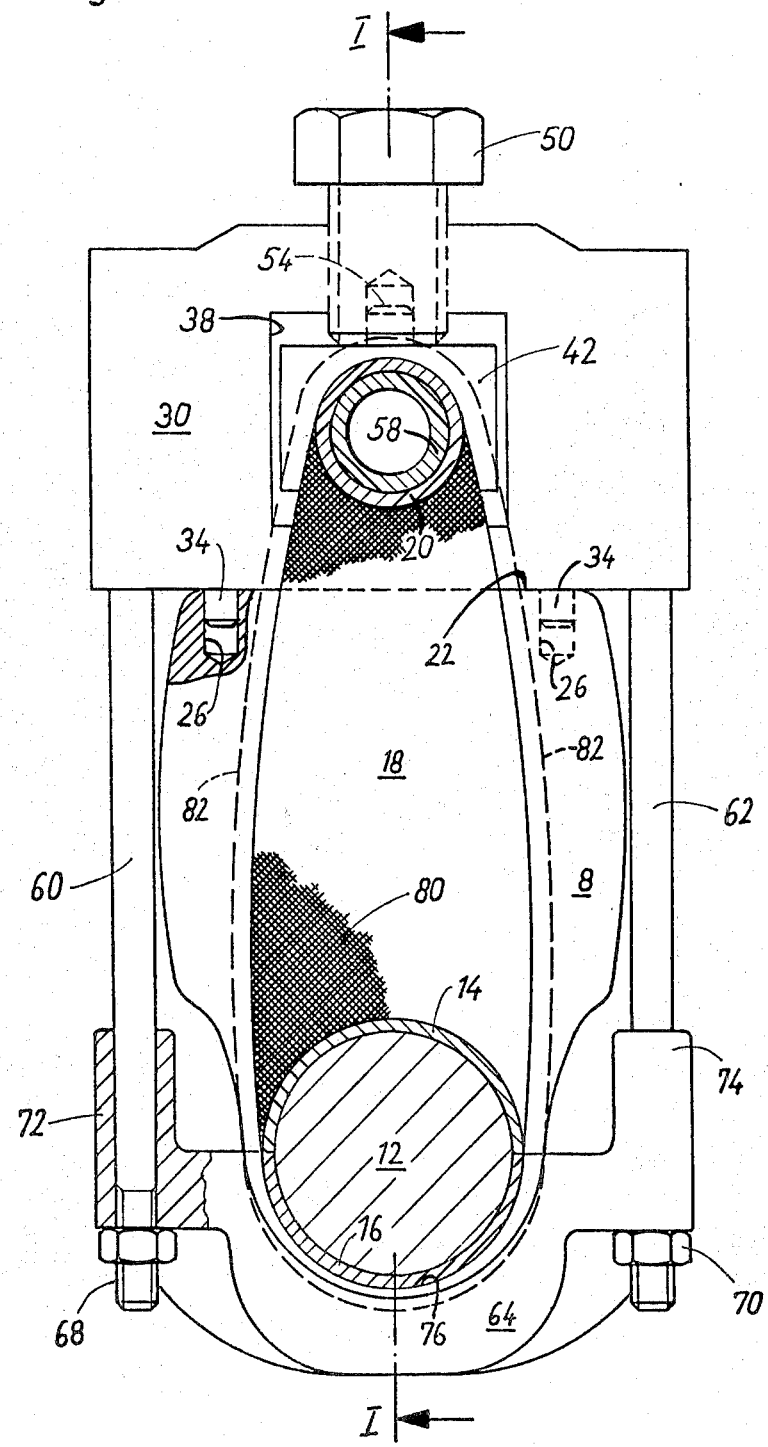

Other objects and advantages of the present invention will become more apparent to those persons having ordinary skill in the art to which the present invention pertains, from the following description taken in conjunction with the accompanying drawings, wherein:

FIG. 1 is a vertical cross-sectional view of a crankshaft of an internal combustion engine, illustrating a connecting rod formed and mounted on a crankpin thereof in accordance with the method of the present invention, and further illustrating a fixture mounted on the crankshaft used in practicing such method, also in accordance with the present invention; and FIG. 2 is a cross-sectional view taken along line II—II in FIG. 1.

Referring to the drawings, there is shown a section of a single-piece crankshaft 2 of a four-cylinder internal combustion engine. The section consists of a crankpin 12 provided between a pair of journals 4 and 6 and connected thereto by means of a pair of conventional crank webs 8 and 10. Mounted on the crankpin is a pair of crankpin bushing segments or shells 14 and 16 consisting of a split bearing providing a pair of semicircular segments. The crankpin bushing segments may be of any conventional construction and also may consist of a steel backing provided with a thin layer of suitable bearing material. Bushing segments 14 and 16 are embedded in a connecting rod shank 18 formed of an epoxy resin reinforced with a glass fiber mat or cloth. Also embedded in the connecting rod shank at the opposite end thereof is a piston pin bushing 20 which is adapted to receive a piston pin therein in the conventional manner.

As best shown in FIG. 1, the upper ends of crank webs 8 and 10 are provided with mounting surfaces 22 and 24, having a set of guide holes 26 and 28. A pair of support brackets 30 and 32 are adapted to be seated on mounting surfaces 22 and 24, which are provided with a set of guide pins 34 and 36 receivable in guide holes 26 and 28 to position support brackets 30 and 32 in predetermined positions relative to crankpin 12.

When support brackets 30 and 32 are mounted on mounting surfaces 22 and 24, they are adapted to be spaced apart a distance S. Such distance is slightly greater than the width of connecting rod shank 18 and the length of piston pin bushing 20. Furthermore, the mounting of support brackets 30 and 32 on webs 8 and 10 is such that the support brackets are disposed perpendicular to the axis of crankpin 12, and that the axis of piston pin bushing 20 is disposed parallel to the axis of crankpin 12.

Support brackets 30 and 32 are provided with a pair of aligned openings 38 and 40 in which there is mounted a pair of carrier members 42 and 44. Carrier members 42 and 44 are slidably guided in openings 38 and 40 so that they may be displaced relative to support brackets 30 and 32 and, correspondingly, crank webs 8 and 10, along lines of travel disposed perpendicular to the axis of crankpin 12. Carrier members 42 and 44 also are provided with a pair of aligned openings 46 and 48 having an axis disposed parallel to the axis of crankpin 12, and inside diameters equal to the inside diameter of piston pin bushing 20. Carrier members 42 and 44 are adapted to be displaced along lines of travel disposed perpendicular to the axis of crankpin 12 by means of a set of adjusting bolts 50 and 52 threaded in openings provided in the upper ends of support brackets 30 and 32. Carrier members 42 and 44 are provided with upwardly projecting portions 54 and 56 which are received within openings provided in bolts 50 and 52 for aligning the bolts with the carrier members. The assembly further includes a tubular support pin 58 which, in the assembled form of the fixture, is received and mounted within the aligned openings of carrier members 42 and 44 and piston pin bushing 20.

As best shown in FIG. 2, each of brackets 30 and 32 is provided with a pair of tie rods 60 and 62 which are threaded into threaded openings provided in the ends of the brackets, and which are provided with threaded opposite ends. Mounted on the lower ends of tie rods 60 and 62 is a pair of yoke or clamping members 64 and 66.

Each of the clamping members is provided with a set of lug portions 72 and 74 having openings for receiving the lower ends of a set of tie rods 60 and 62 therethrough. Each clamping member is supported on the lower ends of a set of tie rods by means of a set of bolts 68 and 70 threaded on the lower ends of the tie rods and engaging the undersides of the clamping member. The intermediate portions of clamping members 64 and 66 are provided with lip portions 76 and 78 having substantially semicircular surfaces which are adapted to engage the lower, longitudinally spaced edges of crankpin bushing segment 16, as best illustrated in FIG. 1. It will be appreciated that by tightening bolts 68 and 70, clamping members 64 and 66 will firmly clamp crankpin bushing segment 16 to the underside of crankpin 12.

In utilizing the assembly fixture as described in practicing the method of the present invention, the connecting rod shank is first formed of an epoxy resin reinforced with a fiber glass mat or cloth. The fiber glass mat or cloth is formed with the fibers oriented diagonally relative to the direction of the loads applied to the connecting rod so as to impart a high compressive, tensile and bending strength to the rod. The ends of the connecting rod shank are then formed with semicircular recesses having radii of curvature corresponding to the radii of piston pin bushing 20 and crankpin bushing segment 14. Piston pin bushing 20 and crankpin bushing segment 14 are then positioned in such recesses. In a manner well known in the art, crankpin bushing segment 14 may be lodged in the lower semicircular recess of the connecting rod shank temporarily, as an example, by means of a projection which extends into the wall of the recess of the connecting rod shank.

With the connecting rod shank thus formed with piston pin bushing 20 and crankpin bushing segment 14 mounted on the upper and lower semicircular recesses thereof, the assembly is ready for mounting on crankpin 12. To do so, support brackets 30 and 32 are mounted on support surfaces 22 and 24 of crank webs 8 and 9. The assembled connecting rod shank is then seated on the crankpin so that crankpin bushing segment 14 engages the upper side of the crankpin and the opening in piston pin bushing 20 is aligned with openings 46 and 48 in carrier members 42 and 44 of support brackets 30 and 32. Support pin 58 is then inserted in the aligned openings of carrier members 42 and 44 and piston pin bushing 20 so that the connecting rod shank is positioned as shown in FIGS. 1 and 2. In such position, the connecting rod shank mounted on the crankpin intersects the axis of rotation 80 of the crankshaft so that the connecting rod shank extends only slightly beyond the edges of crank webs 8 and 10, thereby providing suitable bearing surfaces for support brackets 30 and 32.

Crankpin bushing segment 16 is then mounted on the underside of the crankpin so that the end edges thereof engage the downwardly facing edges of crankpin bushing segment 14. Bushing segment 16 is held in position by moving clamping members 64 and 66 upwardly so that the semicircular surfaces of lip portions 76 and 78 engage the edges of bushing segment 16. The clamping members are maintained in such position by running bolts 68 and 70 up the lower threaded ends of tie rods 60 and 62. As bolts 68 and 70 are tightened against clamping members 64 and 66, support brackets 30 and 32 will be urged against support surfaces 22 and 24. Then, by tightening bolts 50 and 52 to displace carrier members 42 and 44 and support pin 58 downwardly toward crankpin 12, piston pin bushing 20, connecting rod shank 18 and bushing segment 14 will be clamped together and also will be clamped to bushing segment 16, under a predetermined force. In tightening bolts 50 and 52, it will be understood that a suitable means will be used so that the clamping forces applied by bolts 50 and 52 will be equal so as to assure that the axis of support pin 54 and correspondingly the axis of piston pin bushing 20 will be parallel to the axis of crankpin 12.

The connecting rod is then completed by applying a resinous material about the periphery of the unit formed by piston pin bushing 20, connecting rod shank 18 and bushing segment 16, and further applying strands of a suitable reinforcing material which may consists of a metal, a plastic, carbon or fiberglass.

After the connecting rod shank, bushing 20 and bushing segments 14 and 16 have been assembled together on crankpin 12 as shown in the drawings, the crankshaft is rotated about its axis of rotation 80 and a continuous strand of fiberglass coated with an epoxy resin is wound about the periphery of the connecting rod assembly to form a peripheral layer as designated by the reference numeral 82 in FIG. 1. As the crankshaft is rotated, the feeding device for the continuous strand of fiberglass can be reciprocated axially at a suitable feed rate corresponding to the strength of the fiberglass so that the strand applied to the periphery of the connecting rod assembly will be would helically, thus enhancing the strength of the final product.

After the epoxy resin-coated fiberglass strand has been applied, the resin is permitted to cure and thus harden to form an integral structure. In the curing process, either heat may be applied for a short period of time or the material is permitted to set during its prescribed reaction time, depending on the type of resin used. After the resin has hardened, support brackets 30 and 32 and clamping members 64 and 66 are removed by removing nuts 68 and 70 and removing support pin 58. The connecting rod not only will have been formed, but it also will be attached to the crankshaft to permit its installation as an entire assembly.

In manufacturing connecting rods in accordance with the present invention, it is contemplated that several connecting rod assemblies will be mounted on a single crankshaft and that such connecting rods will be formed simultaneously while rotating the crankshaft about its axis. Under such conditions, a number of devices will be utilized to feed separate strands of epoxy resin-coated fiberglass on the connecting rod assemblies mounted on the crankpins of the crankshaft. The curing and hardening of the epoxy resins of all of the connecting rods attached to a single crankshaft can then occur simultaneously, minimizing the time span in the production of such a crankshaft assembly.

The mounting operation of the connecting rod assembly also can be simplified and the number of components of the fixture reduced by omitting carrier members 42 and 44 and adjusting bolts 50 and 52, and providing the openings for support pin 58 directly in support brackets 30 and 32. Under such conditions, the adjusting feature, as previously described, will not be available. However, the component parts of the connecting rod assembly must be fabricated with a greater precision so that when the support brackets are urged against support surfaces 22 and 24, the required load on the connecting rod assembly will proide a suitable preloading of crankpin bushing segments 14 and 16.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of making a crankshaft-connecting rod construction for an internal combustion engine having a single-piece crankshaft comprising:
    positioning a first crankpin bushing segment, having a connecting rod shank consisting of a reinforced resinous material mounted thereon on a crankpin of said crankshaft;
    positioning a second crankpin bushing segment in opposed relationship to said first crankpin bushing segment about said crankpin;
    positioning a piston pin bushing on said connecting rod shank at an end distal from said first crankpin bushing;
    positioning a rigid member in said piston pin bushing with a portion of said member exposed for a clamping operation;
    securing a clamping mechanism to said crankpin and arranging said clamping mechanism to engage said rigid member and edge portions of said second crankpin bushing segment;
    operating said clamping mechanism to press said rigid member while in said piston pin bushing toward said crankpin and to clamp said first bushing segment against said crankpin, and to press said second bushing segment against said crankpin, to clamp said second bushing segment thereto, while leaving a substantial portion of said bushings and connecting rod shank exposed for application of reinforcing material about the periphery of the bushings; and
    applying a reinforcing material about the periphery of said second bushing segment and said piston pin bushing and said connecting rod shank exposed for that purpose to form an integral unit attached to said crankpin.

2. The method according to claim 1 further comprising the step of removing said clamping mechanism after the application step has been completed substantially without affecting the integrity of the formed integral unit attached to said crankpin.

3. A method according to claim 2 wherein said rigid member positioned within said piston pin bushing includes a tubular pin having a length sufficient for exposing ends of the pin from both sides of the piston pin bushing for engagement by the clamping mechanism on either side of the piston pin bushing.

4. The method according to claim 3 wherein said application step includes rotating said crankshaft with said bushings clamped in place and winding strands about the periphery of said bushings and said connecting rod shaft exposed for that purpose during rotation of the crankshaft.

5. The method according to claim 4 wherein the method includes a clamping mechanism having two brackets, and said crankpin including two crankshaft webs, said arranging step including securing one bracket to one web and another bracket to the other web in spaced relationship from said piston pin bushing and said connecting rod shank.

6. The method according to claim 5 wherein said application step includes applying a reinforcing material to the periphery of said connecting rod shank, said piston pin bushing and said second crankpin bushing segment while said brackets are clamped to said first and second crankshaft webs and said removing steps include removing said brackets from said web after said reinforcing material has sufficiently hardened affecting the integrity of the integral unit formed during the application step.

* * * * *